(12) United States Patent
Coplin

(10) Patent No.: US 12,023,693 B2
(45) Date of Patent: Jul. 2, 2024

(54) LIQUID DISPENSING SPRAY NOZZLE ASSEMBLY

(71) Applicant: Spraying Systems Co., Wheaton, IL (US)

(72) Inventor: Thomas L. Coplin, Lake in the Hill, IL (US)

(73) Assignee: Spraying Systems Co., Wheaton, IL (US)

( * ) Notice: Subject to any disclaimer, the term of this patent is extended or adjusted under 35 U.S.C. 154(b) by 148 days.

(21) Appl. No.: 17/470,771

(22) Filed: Sep. 9, 2021

(65) Prior Publication Data
US 2022/0072568 A1 Mar. 10, 2022

Related U.S. Application Data

(60) Provisional application No. 63/076,001, filed on Sep. 9, 2020.

(51) Int. Cl.
| | |
|---|---|
| *B05B 1/26* | (2006.01) |
| *B05B 1/16* | (2006.01) |
| *B05B 1/30* | (2006.01) |
| *B05B 1/34* | (2006.01) |
| *B05B 12/02* | (2006.01) |
| *F16K 31/122* | (2006.01) |

(52) U.S. Cl.
CPC .............. *B05B 1/265* (2013.01); *B05B 1/169* (2013.01); *B05B 1/3013* (2013.01); *B05B 1/3053* (2013.01); *B05B 1/34* (2013.01); *B05B 12/02* (2013.01); *F16K 31/1221* (2013.01)

(58) Field of Classification Search
CPC ....... B05B 1/265; B05B 1/169; B05B 1/3013; B05B 1/3053; B05B 12/02; B05B 1/34

USPC ......................................................... 239/518
See application file for complete search history.

(56) References Cited

U.S. PATENT DOCUMENTS

| | | | | | |
|---|---|---|---|---|---|
| 6,036,106 A | * | 3/2000 | Peet | ....................... | B05C 5/0225 239/128 |
| 6,056,155 A | * | 5/2000 | Byerly | .................. | B05C 5/0225 239/11 |
| 6,089,413 A | * | 7/2000 | Riney | .................... | B05B 7/0861 222/504 |
| 6,164,568 A | * | 12/2000 | Muller | .................. | B05C 5/0237 239/584 |

(Continued)

FOREIGN PATENT DOCUMENTS

| | | |
|---|---|---|
| DE | 10357088 A1 | 7/2005 |
| EP | 2230024 A2 | 9/2010 |

OTHER PUBLICATIONS

International Bureau, International Search Report in International Application No. PCT/US2021/049676, mailed Jan. 18, 2022.

*Primary Examiner* — Chee-Chong Lee
(74) *Attorney, Agent, or Firm* — Leydig, Voit & Mayer, Ltd.

(57) ABSTRACT

A modular liquid distribution system in which each module has a module body, a spray nozzle, and a piston for controlling the dispensing of liquid from the nozzle. Each module has a pneumatically operated system for moving the piston to an open position while facilitating quicker return movement to a closed position, enabling the dispensing of precisely controlled small droplet sized quantities of highly viscous liquids.

7 Claims, 8 Drawing Sheets

(56) References Cited

U.S. PATENT DOCUMENTS

| | | | | |
|---|---|---|---|---|
| 6,253,957 | B1* | 7/2001 | Messerly | B05C 5/0225 |
| | | | | 222/61 |
| 6,296,463 | B1* | 10/2001 | Allen | D01D 5/0985 |
| | | | | 425/7 |
| 6,669,057 | B2* | 12/2003 | Saidman | B05C 5/0258 |
| | | | | 239/135 |
| 2014/0048615 | A1 | 2/2014 | Wurz | |

* cited by examiner

LIQUID DISPENSING SPRAY NOZZLE ASSEMBLY

CROSS-REFERENCE TO RELATED APPLICATIONS

This patent application claims the benefit of U.S. Provisional Patent Application No. 62/076,001, filed on Sep. 9, 2020, which is incorporated by reference.

FIELD OF THE INVENTION

The present invention relates to liquid dispensing systems, and more particularly, to liquid dispensing systems having nozzles for dispensing small controlled quantities of highly viscous liquids.

BACKGROUND OF THE INVENTION

In many industries there is a need for dispensing small, controlled quantities of highly viscous liquids. In the food industry, by way of example, in the commercial production of pizzas, it is required to dispense small droplet sized quantities of sauces onto the pizza dough. Because of the thick nature of the sauce, it is difficult to rapidly dispense closely controlled small liquid droplets as desired. Moreover, if the sauce contains solids that can clog the nozzle passages, the flow passages must be sized larger making it even more difficult to control the dispensing of small droplets and often resulting in undesirable splattering of discharging sauce. Furthermore, when the dispensing device uses an air operated liquid control piston, rapid operation of the piston is limited by the compressibility of the controlling air. Additionally, when air operated devices are spring returned, the springs return force can be limited up to roughly half of the air pressure's force used to open the device, which resists rapid piston closure.

OBJECTS AND SUMMARY OF THE INVENTION

It is an object of the invention to provide a liquid dispensing system having spray nozzles effective for dispensing precisely controlled small droplet sized quantities of highly viscous liquids.

Another object is to provide a liquid dispensing system as characterized above that is effective for rapidly depositing precisely controlled pixel sized droplets without undesirable splattering of the liquid.

A further object is to provide a liquid dispensing system of the above kind in which the spray nozzles are operable with larger inlet passages less susceptible to clogging from the solids content in the liquid.

Yet another object is to provide such a liquid dispensing system which can be selectively operated for dispensing different sized precisely controlled small droplets.

Another object is to provide such a liquid dispensing system that can be operated more rapidly.

A further object is to provide a liquid dispensing system of such type that have air actuated pistons with return springs the function of which is less resistant to air pressures used in operating the system.

Still another object is to provide a liquid dispensing system of the foregoing type that is relatively simple in design and lends itself to economical manufacture and efficient usage.

Other objects and advantages of the invention will become apparent upon reading the following detailed description and upon reference to the drawings.

Figure 1:
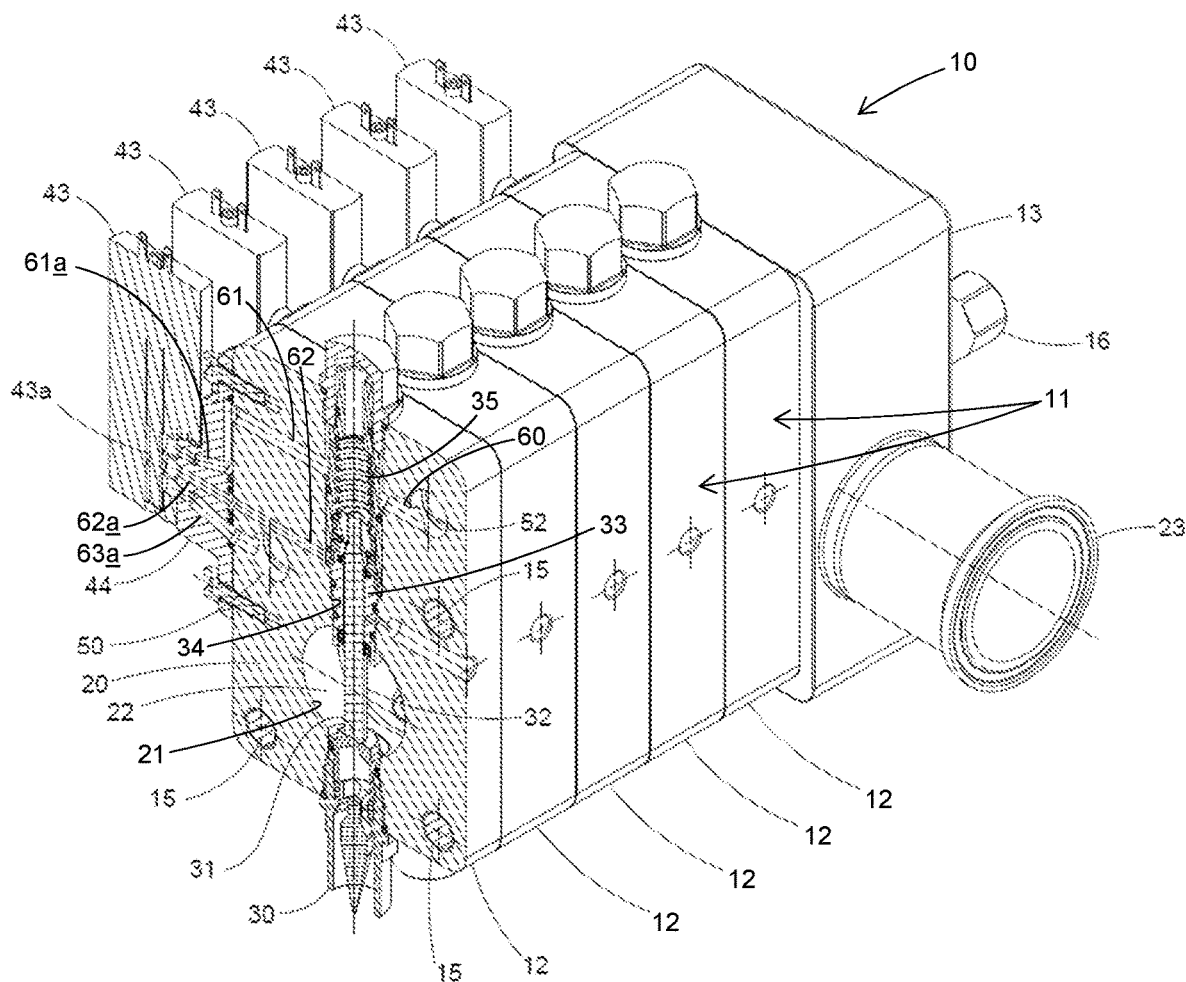
FIG. 1 is a fragmentary perspective of an illustrative modular constructed liquid dispensing system in accordance with the invention.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE PREFERRED EMBODIMENT

Figure 2:
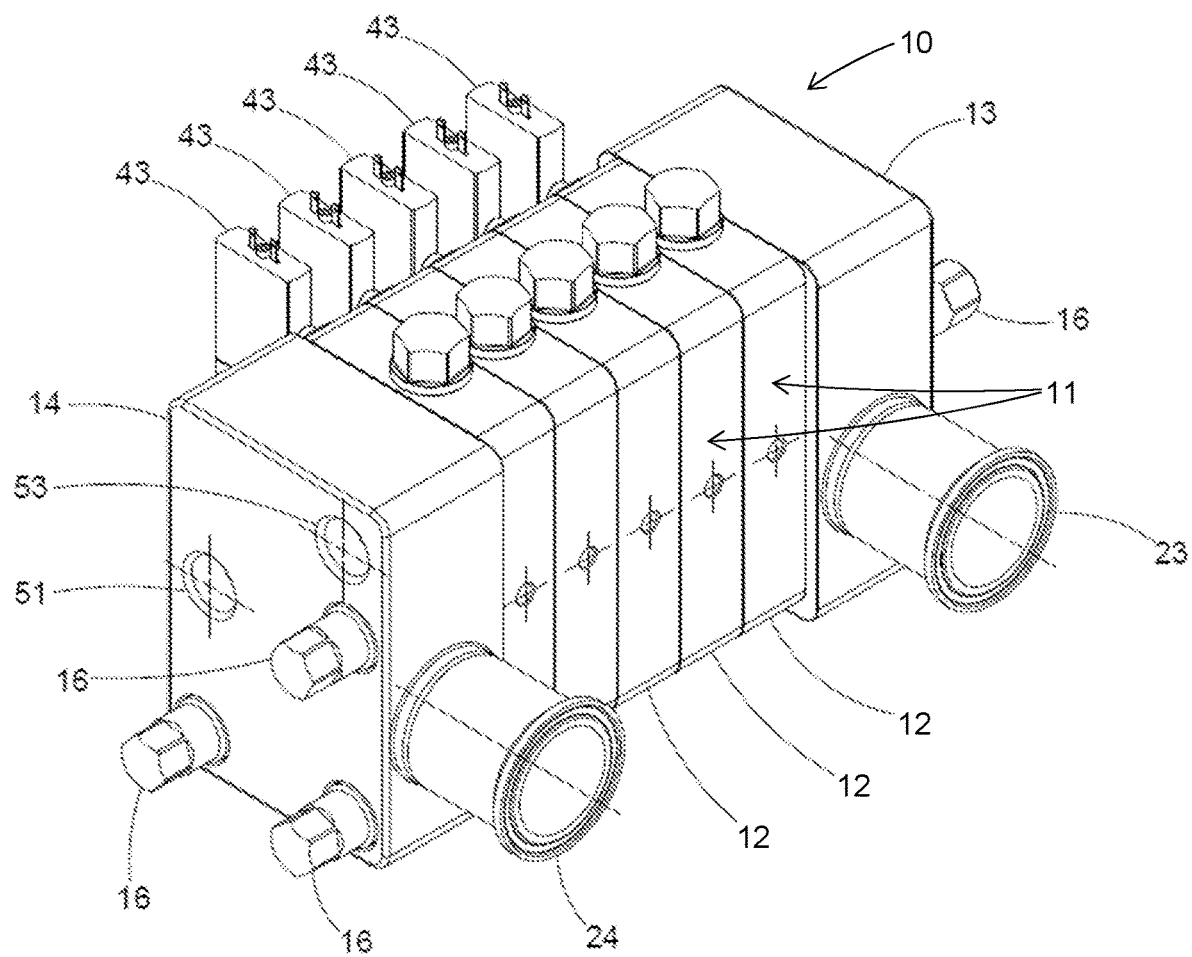
FIG. 2 is a perspective of the fully assembled liquid dispensing system.
Figure 3:
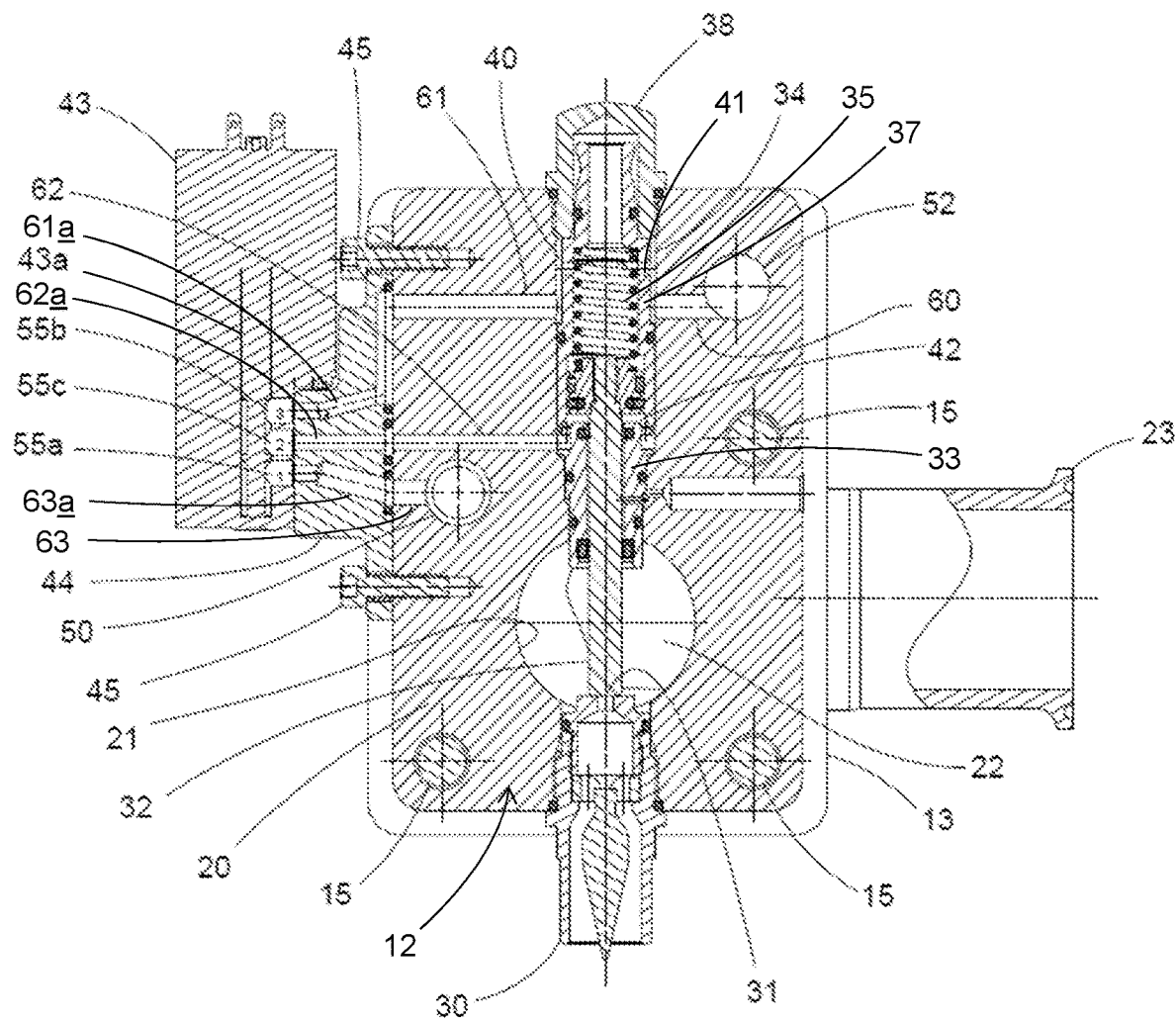
FIG. 3 is a vertical section of one of the liquid dispensing modules of the illustrated liquid dispensing system.

Referring now more particularly to FIGS. 1-3 of the drawings, there is shown an illustrative liquid dispensing system 10 in accordance with the invention. The illustrated liquid dispensing system 10 is in the form of a modular valve manifold 11 comprising a plurality of individual liquid dispensing modules 12 supported and retained in sealed side by side stacked relation between end blocks 13 and 14 at opposite ends secured together by tie rods 15 and nuts 16. Each module 12 includes a module nozzle support body 20 formed with a liquid supply port 21 disposed in aligned relation with liquid supply ports 21 of the adjacent modules 12 for defining a common liquid supply passage 22 communicating between a liquid inlet port 23 in the upstream end block 13 and a liquid outlet port 24 in the downstream end block 14. Hence, liquid directed to the inlet 23 communicates through each of the stacked modules 12.

Each illustrated module 12 has a respective spray nozzle 30 mounted in depending relation to an underside of the module nozzle support body 20 having an upstream liquid inlet 31 in an upper side communicating with the liquid supply passage 22. For controlling liquid from the common liquid supply passage 22 to the spray nozzle inlet 31 of the module 12 a piston 32 is supported in each module body 20 above the spray nozzle inlet 31 for reciprocating movement between a raised inlet open position and a lowered inlet closed position.

Figure 4:
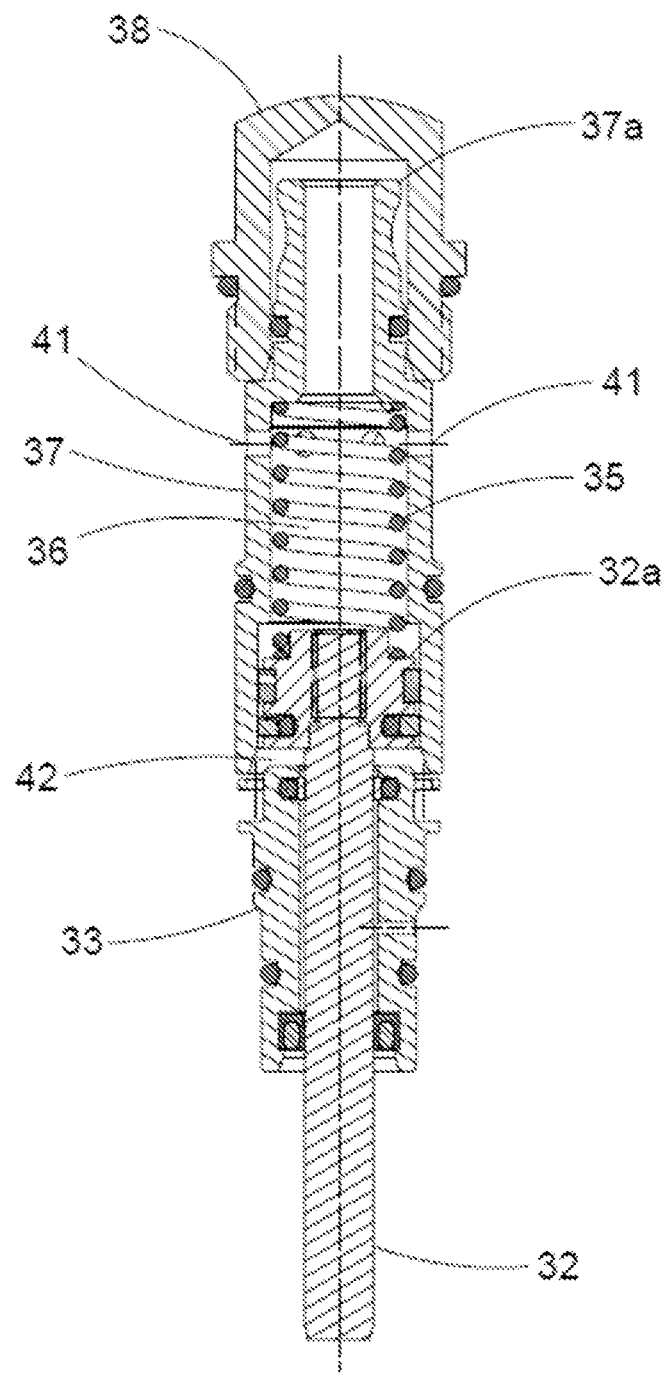
FIG. 4 is an enlarged vertical section of the central liquid control piston assembly of the liquid dispensing modules shown in FIG. 3.

Each piston 32 in this case is supported for selective relative movement in a carrier 33 mounted in sealed relation within a vertical opening 34 of the respective module body 20 with a downstream end of the piston 32 extending through the liquid supply passage 22 for engagement with the spray nozzle inlet 31. For biasing the piston 32 in a lowered position closing the spray nozzle inlet 31, a return spring 35 is disposed within a spring chamber 36 of the module body 20 in interposed relation between a head 32a of the piston 32 and a retention sleeve 37 secured within an upper end of the body opening 34 and retained by a retention cap 38 threadedly engaged within an upper end of the body opening 34. The retention sleeve 37 in this case extends downwardly about the return spring 35 and the piston head 32a, as best depicted in FIGS. 3 and 4. The spring retention sleeve 37 and opening 34 of the module body 20 in this case define an annular air flow passage 40 (FIG. 3) about the retention sleeve 37 which communicates to and through the spring chamber 36 by circumferentially offset holes 41 in the spring retention sleeve 37. A sealed piston chamber 42 is defined between opposing axel ends of the piston head 32a and the carrier 42 (FIG. 4).

Figure 8:
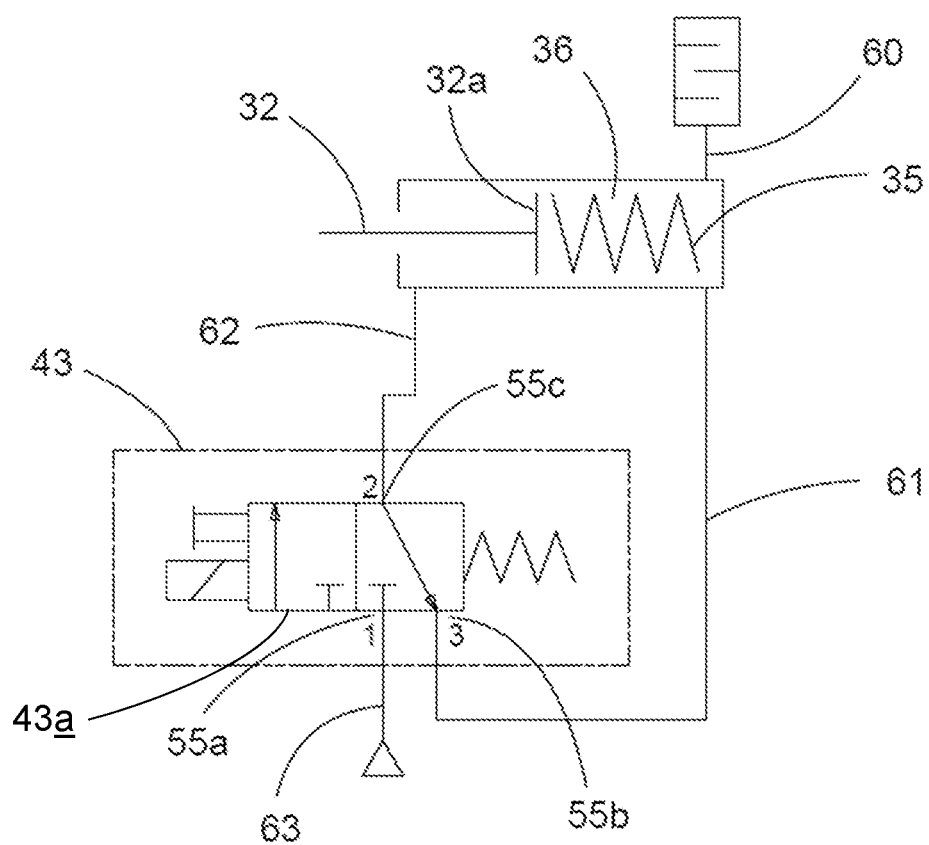
FIG. 8 is a diagrammatic depiction of a solenoid control valve associated with each respective liquid dispensing module.

Pursuant to an important feature of this embodiment, each module body has a pressurized air passage system controlled by a respective valve such that pressurized air that moves the piston to an open position also augments rapid movement of the piston to closure. In the illustrated embodiment, operation of the piston 32 of each module 12 between open and closed positions is controlled by a respective solenoid valve 43, as best depicted in FIGS. 3 and 8. Each module solenoid valve 43 is attached to its respective module body 20 with a solenoid mounting block 44 mounted in sealed relation to its respective module body 20 by screws 45. The module bodies 20 each have an air supply port 50 aligned with the air supply port 50 of each adjacent module body to define a common air inlet passage communicating with a system air inlet port 51 in the end block 14. The module bodies 20 further each have an air outlet port 52 aligned to define a common outlet air passage communicating with a system exhaust outlet port 53 in the end block 14. The air supply port 50 of the module body 20 communicates through inlet air passages 63, 63a in the module body 20 and solenoid mounting block 44 to an air inlet port 55a of the solenoid valve 43. The air outlet port 52 of the module body 20 communicates through outlet passage 60 with the return spring chamber 36 via holes 41 in the retention sleeve 37 and the annular passage 40 about the sleeve 37, and outlet passages 61, 61a in the module body 20 and solenoid mounting block 44 with an exhaust port 55b of the solenoid valve 43. The piston chamber 42 communicates via work passages 62, 62a in the module body 20 and solenoid mounting block 44 with a work port 55c of the solenoid control valve 43.

When the solenoid valve 43 in this case is in its natural or non-energized state, inlet pressure at solenoid valve port air inlet 55a is blocked by a mechanism 43a, in this case in the form of a stem, of the solenoid valve 43 (FIG. 8) preventing pressurized air at the air supply port 50 of the module body 20 from communicating with the piston chamber 42 via passages 62a, 62 in the solenoid mounting block 44 and module body 20. Additional passage routing when the solenoid valve 43 is in its natural or non-energized state connects ports 55c, 55b of solenoid valve 43, allowing communication of air between piston chamber 42 and outlet port 52 in the module body 20 via passages 62, 62a in the module body 20 and solenoid mounting block 44, outlet passages 61a, 61 in the solenoid mounting block 44 and module body 20, the annular passage 40 about through the spring 35 via holes 41, and outlet passage 60.

When the solenoid valve 43 is energized, the solenoid shifts actuating mechanism 43a to close exhaust port 55b removing the connection of port 55c to atmosphere and connecting solenoid valve ports 55a, 55c. Pressurized air at the air supply port 50 of module body 20 then communicates with pressure chamber 42 via passages 63, 63a in the module body 20 and solenoid mounting block 44, solenoid valve ports 55a, 55c and passages 62a, 62 causing the piston 32 to stroke upwardly, opening the nozzle inlet 31 and compressing the return spring 35. The upward stroke of the piston head 32a imparts a positive air displacement within the spring chamber 36 resulting in a slight pressure increase. The pressure increase in the spring cavity 36 drains through holes 41 in the spring retention sleeve 37, annular passage 40, outlet passage 60, and air outlet port 52 to atmosphere pressure (FIGS. 3 and 4). The nozzle inlet 31 remains open, allowing liquid flow, from the common liquid supply passage 22 through the spray nozzle 30 to atmosphere while the solenoid is energized.

When un-energized, the solenoid valve 43 shifts back to the natural state. Inlet air pressure at solenoid port 55a is again blocked preventing pressurized air from entering the device. Rapid decompression of the pressurized air in piston chamber 42 causes a migration of elevated pressure within passages 62, 62a in the module body 20 and solenoid mounting block 44, ports 55c and 55b of solenoid valve 43, outlet passage 61a and 61 in the solenoid mounting block 44 and module body 20, spring chamber 36, outlet passage 60, and outlet port 52 as the system pressure in piston chamber 42 is released and equalizes with the atmosphere. Migrating pressure in the annular passage 40 communicates through holes 41 in spring retention sleeve 37 causing elevated pressure within spring chamber 36 and acting on the surface area of piston head 32a within the spring chamber 36 resulting in a momentary downward force supplementing the constant downward force from return spring 35 opposing the decompressing pressure in the piston chamber 42, returning piston 32 to its natural state, closing passage 31 and stopping liquid flow through spray nozzle 30, from common liquid supply passage 22. An appreciable decrease in time required to return the piston 32 to its natural state is attributed to the momentary increase in pressure within the spring chamber 36. All passages and cavities downstream of solenoid valve 43 including spring chamber 36 intrinsically return to atmospheric pressure through an outlet port 52 effectively removing the supplemental force the transient pressure applied to piston head 32a.

Further operation of the liquid dispensing module 12 by again energizing solenoid 43 is unaffected by the previous cycles increased pressure in the spring chamber 36 as the increased pressure is transient and quickly returns to atmosphere pressure allowing the increased pressure to have the desired effect on piston's 32 opening stroke without effecting the piston's 32 closing stroke. As it will become apparent, the solenoid valve 43 can be cycled at predetermined rates for the particular dispensing operation with the piston's 32 variable open time providing a varying pixel volume.

Figure 5:
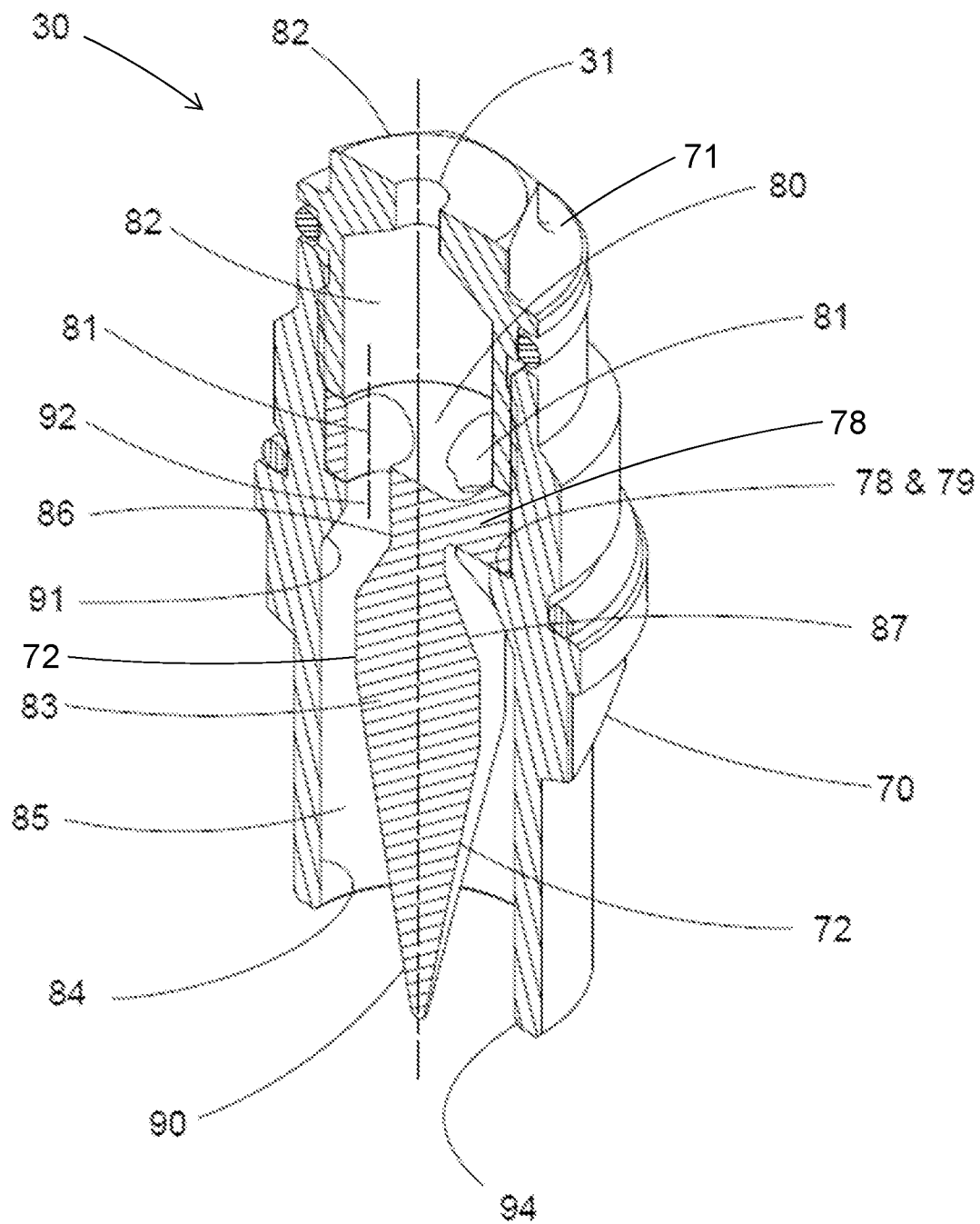
FIG. 5 is an enlarged perspective, in vertical section, of the spray nozzle assembly of one of the liquid dispensing modules of the illustrated system.
Figure 6:
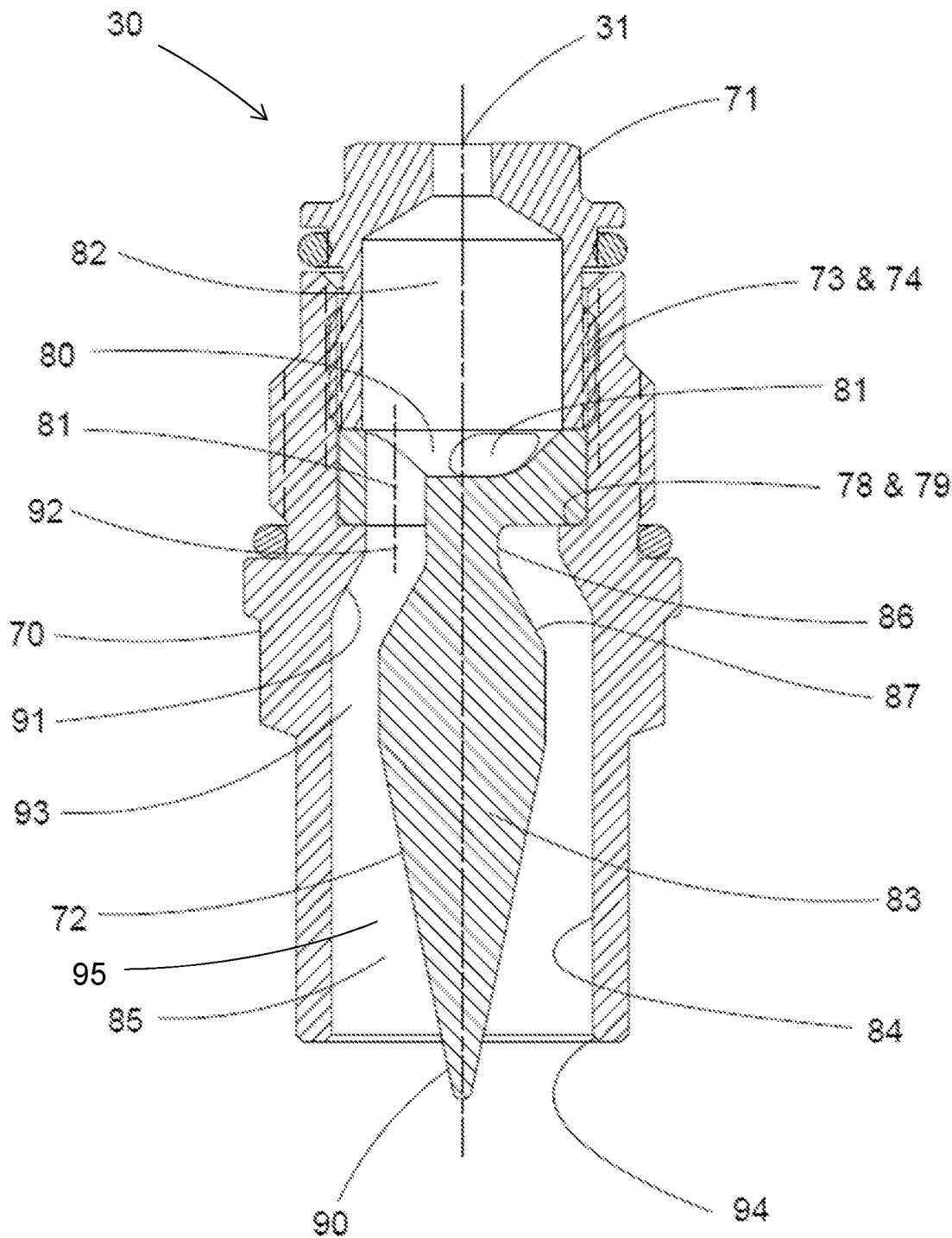
FIG. 6 is a vertical section of the spray nozzle assembly shown in FIG. 5.
Figure 7:
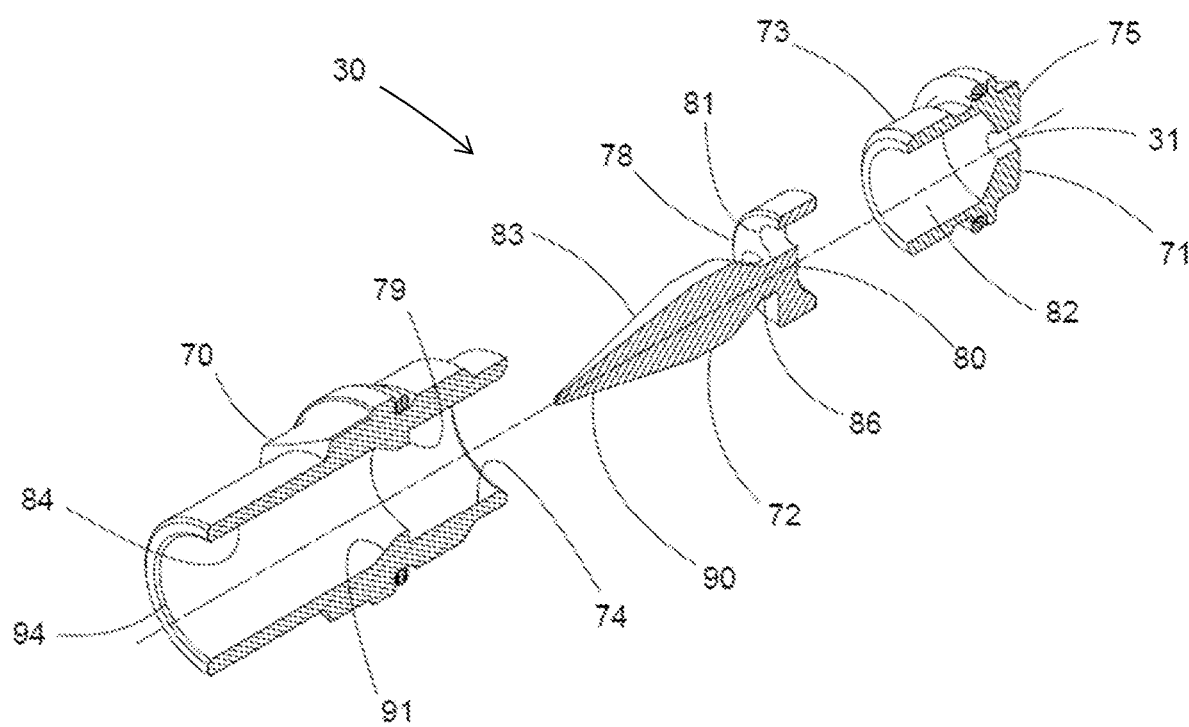
FIG. 7 is an exploded perspective of the spray nozzle assembly shown in FIGS. 5 and 6.

In accordance with a further aspect of the present embodiment, each spray nozzle module 12 is operative for dispensing controlled small round pixel sized droplets of highly viscous liquid as an incident to cycling of the piston 32 even when the liquid has an appreciable solids content. Each spray nozzle 30 with particular reference to FIGS. 5, 6, and 7, in this case comprises a nozzle body 70, a nozzle seat 71 and an internal nozzle core 72. The nozzle seat 71 in this instance has an externally threaded cylindrical downstream end 73 that is threadedly engaged within an upstream cylindrical end 74 of the nozzle body 70 to secure the nozzle core 92 within the nozzle body 70. An upstream end 75 of the nozzle seat 71 defines the predetermined size liquid inlet 31, which is at the upstream end of the assembly. The nozzle core 72 in this instance has an upstream cylindrical mounting flange 78 positioned on an annular ledge 79 within the nozzle body 70 and retained in place by the nozzle seat 71, although it will be appreciated that other methods may be used to secure the nozzle core 72 within the nozzle body 70.

The cylindrical mounting flange 78 of the core 72 has a concavely configured (relative to the direction of fluid flow) downstream end wall 80 formed with a plurality of circumferentially spaced axially oriented liquid orifices 81. These liquid orifices that communicate between an expansion cavity 82 of the nozzle seat 71 and an annularly configured liquid discharge passage defined between the nozzle core 72 and the nozzle body 70 for directing liquid in a controlled fashion for optimum dispensing in small droplet form as will become apparent. It will be understood that while the illustrated nozzle 30 comprises a multi-part assembly, alternatively, it could have a one-piece construction or fewer or greater assembled parts.

In carrying out this aspect of the present embodiment, the nozzle core 72 has a teardrop shaped pintle 83 which together with the internal circumferential surface of the surrounding nozzle body 70 defines an expanding discharge passage 85 that reduces exit velocity of the dispensed liquid for maintaining a desired flow rate and consistent droplet size of the highly viscous discharging liquid. To that end, the illustrated pintle 83 (see FIGS. 5, 6, and 7) has a relatively small diameter upstream end section 86 extending centrally from the mounting flange 78, a radially outwardly extending curved section 87 adjacent to the upstream end, and an inwardly tapered, relatively long conical terminal end section 90. As noted, the nozzle body 70 has a generally hollow cylindrical configuration with the internal circumferential surface of the nozzle body 70 defining the outer wall of the annular discharge passage 85 about the core section 72. The inner wall of the discharge passage 85 is defined by the outer surface of the pintle 83. In this case, the internal circumferential surface of the nozzle body 70 includes a radially outwardly directed section 91 that extends in surrounding relation to the outwardly curved section 87 of the nozzle core 72 and a uniform diameter section 84 that then extends downstream substantially the remaining length of the pintle 83. The design is unique in that flow through the annular discharge passage effects inward expansion of viscous liquid during travel through the nozzle body. The geometry of the pintle defines the inner diametric wall of the annular flow path while providing a structure against which a vacuum due to the flow expansion can be formed. The deceleration of the liquid within the expanding annular discharge passage is a function of the surface tension and the capillary forces' ability to draw a vacuum and resist flow.

In operation, with continued reference to FIG. 3, when the piston 32 is in a raised inlet open position, liquid is permitted to pass through the nozzle inlet 31 in a controlled fashion into the expansion cavity 82 defined within the cylindrical downstream end of the nozzle seat 71. Liquid passing through the nozzle inlet 31 is directed against an impingement surface defined by the concave downstream end wall 80 of the expansion cavity 82. This causes liquid to fill the expansion cavity 82 and then subsequently extrude from the expansion cavity through the series of circumferentially spaced orifices 81 into the discharge passage 85. Moreover, the size of each of the orifices 81 is at least as large as the nozzle inlet 31 to allow solid particles in the liquid to flow from the expansion cavity 82 to the fluid discharge passage 85 without clogging. The collective area of the circumferentially spaced orifices 81 is greater than the area of the nozzle inlet 31 such that the velocity of the liquid passing through the orifices 81 is inversely proportional to the ratio of the size of the orifices 81 to the size of the nozzle inlet 31.

More specifically, the circumferential orifices 81 at the downstream end of the expansion cavity 82 communicate with an inlet section 92 of the discharge passage 85 that is defined between the outwardly directed wall section 91 of the nozzle body 70 and the pintle 83 of the nozzle core 72. The cross-sectional area of the annular inlet section 92 may increase as the section extends in the downstream direction such that the velocity of the fluid in this region continues to be reduced as the cross-sectional area of the discharge passage expands. A slight reduction in the cross-sectional area of the discharge passage 85 in a subsequent stabilizing section 93 of the discharge passage 85 (again defined by the outer surface of the pintle 83 and the inner circumferential surface of the nozzle body 70) immediately downstream of the inlet section 92 can provide a slight increase in pressure. This increase in pressure stabilizes and balances the flow removing individual jet streams caused by the fluid entering the inlet section 92 of the discharge passage 85 through the series of orifices 81 and allows uniform flow along the internal wall surface of the nozzle body 70. The cross-sectional area of the stabilizing section 93 remains constant through this region as the fluid gains stability.

Downstream of the stabilizing section 93, the liquid enters a final expansion section 95 defined by the inwardly tapered terminal end section 90 of the nozzle core 72 that extends downstream to a nozzle mouth 94 defined at the downstream end of the nozzle body 70. The progressively increasing cross-sectional area of the final expansion section 95 is achieved through the reducing conical diameter of the pintle 83 in the terminal end section 90 while the inner circumferential surface of the nozzle body 70 is maintained at a consistent diameter. The pintle 83 helps stabilize the fluid and enables greater expansion of the liquid than could be achieved with nozzle core having a simple uniform diameter. Sustained contact of the liquid with inner and outer wall surfaces of the discharge passage is a function of the surface tension of the liquid.

The cross-sectional area of the final expansion section 95 at the nozzle mouth 94 defines the exit velocity of the liquid, which is inversely proportional to the cross-sectional area at the nozzle mouth 94 in relation to the area of nozzle inlet 31. The terminal end section 90 of the nozzle core 72 preferably extends slightly beyond the nozzle mouth 94 to assist in breaking the surface tension of the liquid with the inner circumferential surface of the nozzle body 70 without impacting the outer diameter of the discharging liquid stream. Having the inner circumferential surface of the nozzle body 70 at a constant diameter helps establish a consistent diameter of the boundary layer of the liquid when it exits the nozzle, which assists in maintaining the desired droplet diameter independent of the distance of the nozzle from the target.

It has been found that a dramatic reduction in the velocity of the liquid can be achieved through progressively increasing the cross-sectional area of the discharge passage 85. The inward expansion of the discharge passage 85 is achieved by progressively reducing the diameter of the pintle 83 while maintaining the inner circumferential surface of the nozzle body 70. This helps produce discharging liquid with a consistent stream diameter. The reduced velocity of the liquid allows it to be dispensed without splattering. This further allows the utilization of larger nozzle inlet orifices 31 for enabling the dispensing of liquids with larger solids content. Once the discharge passage of the nozzle is initially filled with viscous fluid, the surface tension of the liquid will keep the nozzle 30 charged with liquid ready to be dispensed upon opening of the nozzle inlet 31. Because the liquid can be substantially incompressible, an exact relationship can be maintained between the liquid volume entering the nozzle 30 through the inlet 31 and the liquid exiting the nozzle mouth 94. Cycling the piston 32 to open and close the inlet orifice 31 at a rapid rate, such as 50 milliseconds, has been found to produce small, consistent droplets of liquid that are discharged at a reduced exit velocity. This allows the discharging droplets to be deposited on a target, such as a target about 2 inches from the nozzle, without splattering.

From the foregoing, it can be seen that a liquid dispensing system is provided that can be selectively operated for dispensing precisely controlled droplets without undesirable splattering of the dispensed liquid. The system further includes spray nozzles that are less susceptible to clogging from the solids content of the liquid. Yet the liquid dispensing system and the liquid spray nozzles thereof are relatively simple in design and lends itself to economical manufacture and efficient usage. While the spray nozzles have been shown and described in conjunction with an illustrative liquid dispensing system, it will be understood that the spray nozzles could be used in other applications for dispensing controlled relatively small quantities of liquid.

What is claimed:

1. A spray nozzle comprising:
   a nozzle seat having a liquid inlet in fluid communication with a downstream expansion cavity, said expansion cavity terminating at a downstream end wall;
   a nozzle body having a hollow cylindrical section defining an internal circumferential surface; and
   an internal nozzle core arranged within the nozzle body and including a teardrop shaped pintle having an upstream end section downstream of said expansion cavity, a radially outward curved section adjacent the upstream end section, and an inwardly tapered conical terminal end section longer in length than said outwardly curved section; said inwardly tapered conical terminal end section of said nozzle core and said hollow wall cylindrical section of said nozzle body surrounding said inwardly tapered conical terminal end section defining an outwardly expanding chamber in fluid communication with said expansion cavity longer in length than said outwardly curved section and sufficient for drawing a vacuum for reducing the fluid flow rate prior to discharge from said spray nozzle, and a terminal end of said pintle and said nozzle body defining an annular discharge passage of said spray nozzle;
   wherein the nozzle including a cyclically operable liquid supply for directing liquid to said liquid inlet having a viscosity such that the liquid discharges from the annular discharge passage in discreet droplets.

2. The spray nozzle of claim 1 wherein said downstream end wall has a concave upstream side.

3. The spray nozzle of claim 2 wherein said downstream end wall includes a plurality of circumferentially spaced orifices each of which is in fluid communication with said liquid inlet and for direction into said outwardly expanding chamber.

4. The spray nozzle of claim 3 wherein each of the circumferentially spaced orifices has a cross-sectional area equal to or greater than a cross-sectional area of the liquid inlet.

5. The spray nozzle of claim 1 wherein the nozzle body includes a radially outwardly directed section that extends in surrounding relation to the outward curved section of the pintle and a uniform diameter cylindrical section that extends in surrounding relation to a remaining length of the pintle.

6. The spray nozzle of claim 1 wherein a downstream end of the nozzle body defines a nozzle mouth and wherein the terminal end section of the pintle extends beyond the nozzle mouth.

7. The spray nozzle of claim 1 wherein the nozzle seat is engaged within an upstream end of the nozzle body and the nozzle core has an upstream mounting flange that forms said downstream end wall of said expansion chamber and is positioned on annular ledge in the nozzle body and retained in place by the nozzle seat.

* * * * *